Figures 1, 8:
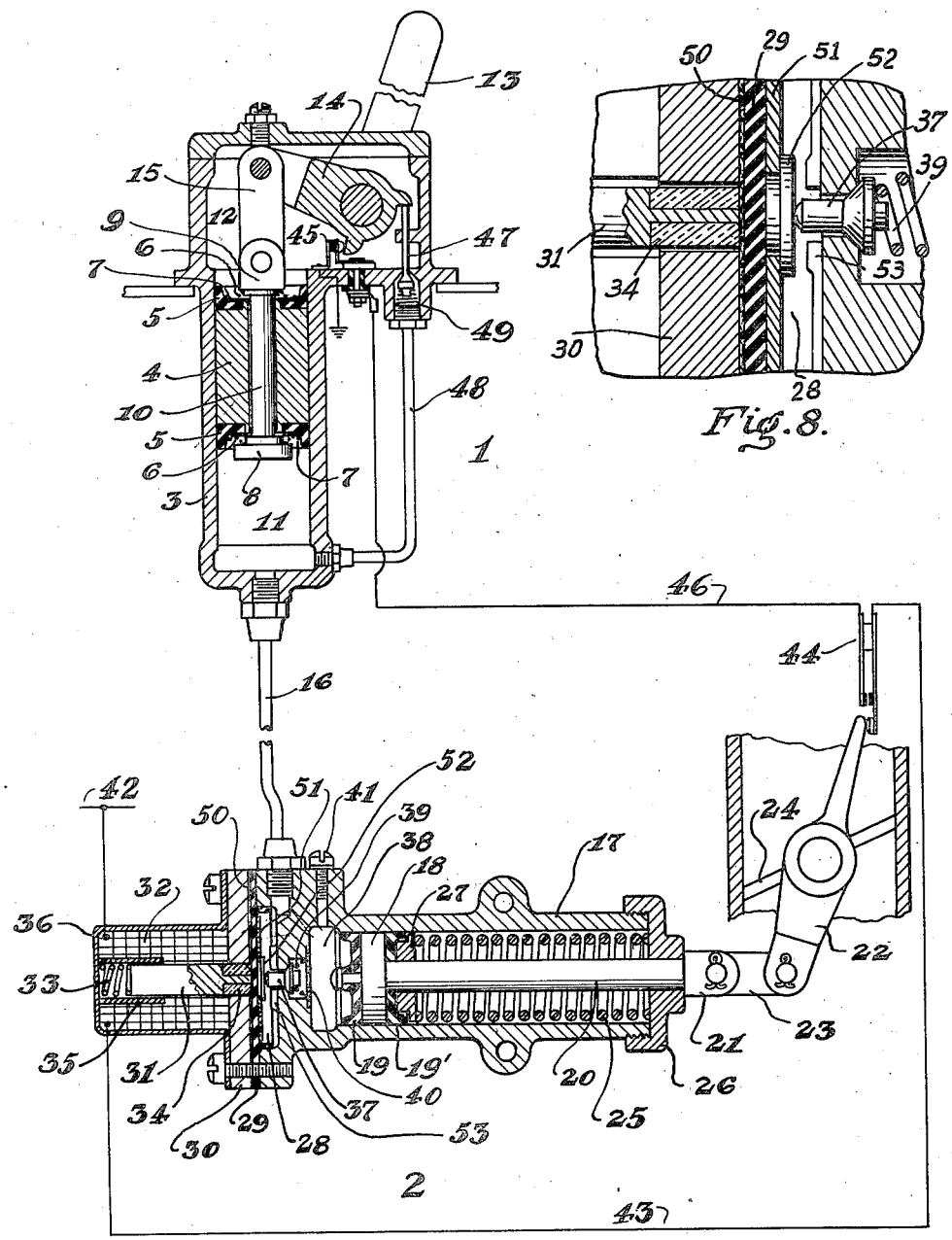

Jan. 2, 1940.                W. STELZER                2,185,277
                        HYDRAULIC REMOTE CONTROL
                    Filed Jan. 4, 1937        4 Sheets-Sheet 1

INVENTOR.
William Stelzer

Jan. 2, 1940. W. STELZER 2,185,277
HYDRAULIC REMOTE CONTROL
Filed Jan. 4, 1937 4 Sheets-Sheet 3

INVENTOR.
William Stelzer

Jan. 2, 1940.　　　　W. STELZER　　　　2,185,277

HYDRAULIC REMOTE CONTROL

Filed Jan. 4, 1937　　　4 Sheets-Sheet 4

INVENTOR.
William Stelzer

Patented Jan. 2, 1940

2,185,277

UNITED STATES PATENT OFFICE 2,185,277

HYDRAULIC REMOTE CONTROL

William Stelzer, German Township, St. Joseph County, Ind., assignor to Bendix Aviation Corporation, South Bend, Ind., a corporation of Delaware Application January 4, 1937, Serial No. 118,978

9 Claims. (Cl. 60—54.5)

The invention relates to hydraulic remote control or hydraulic transmission, and more particularly, to a hydraulic remote control where the actuated element is hydraulically locked to maintain the same position regardless of fluid expansion or leakage in the lines.

Hydraulic remote control, consisting, essentially, of a master cylinder or prime mover, and an actuator or motor, used as a means for operating engine throttles or governors, clutches, landing gear retracting mechanisms, marine rudder operators, brakes and the operation of controlling surfaces in aircraft, as well as any remote hydraulic transmission of motion where an element has to be held in a certain position, at the present is subjected to the expansion of the operating fluid due to heat changes, as well as to the leakages of the master and the transmission lines.

It is the object of the invention to minimize the change of position of the actuated element by providing a hydraulic lock, i. e., by locking the fluid in the actuated element so that the latter maintains the same position, and by providing a free passage in the master to allow for expansion of the fluid.

Another object is to provide a hydraulic control system where a plurality of master cylinders may be used without affecting the accuracy of position of the actuated element.

A further object is to provide a construction that operates in any position and is not subjected to the admission of air, as required in aircraft that may fly in different positions or upside-down.

A still further object is to provide synchronizing means so that the position of the master cylinder, or master cylinder lever, will indicate the exact position of the actuated element.

Figure 2:
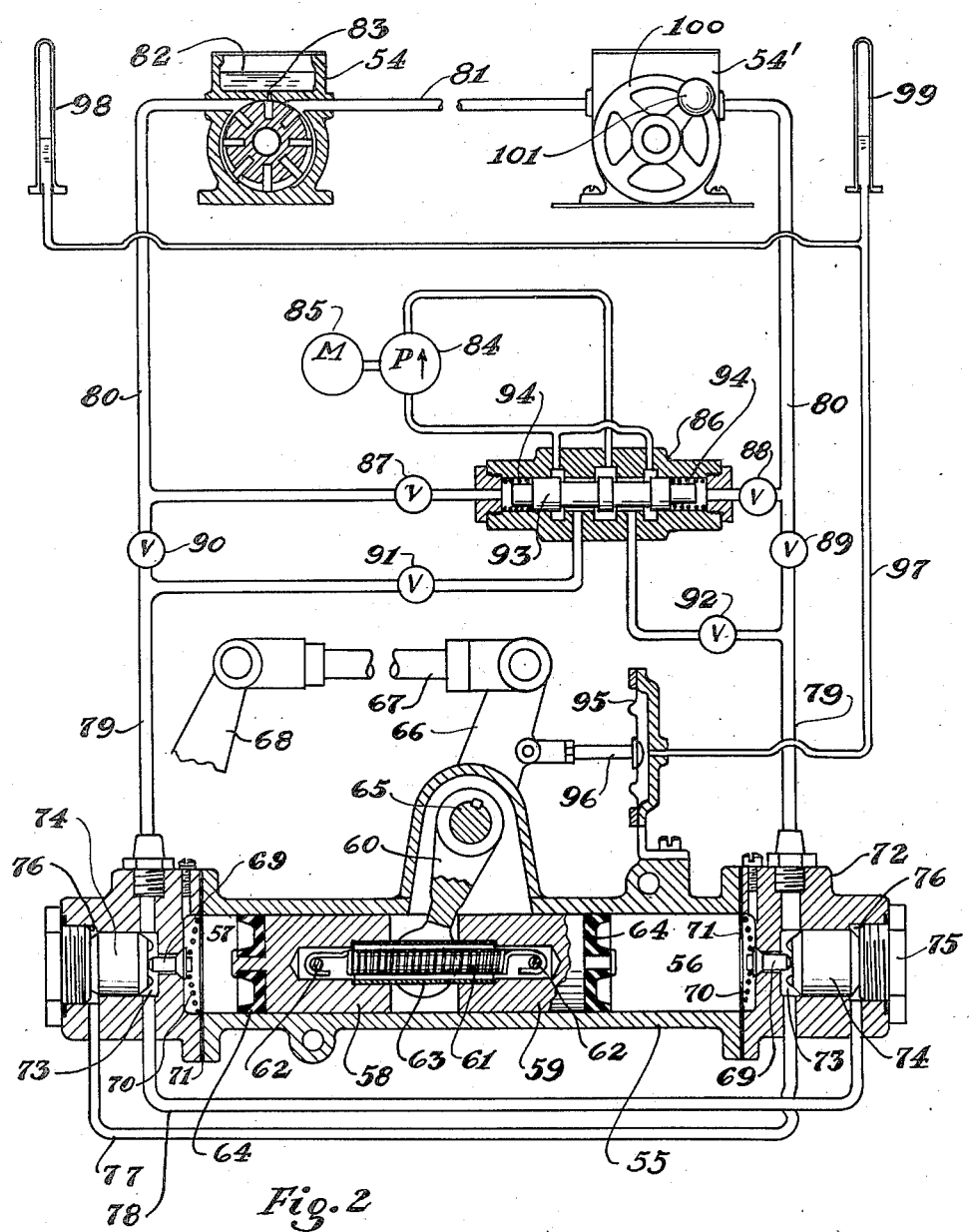
Figure 3:
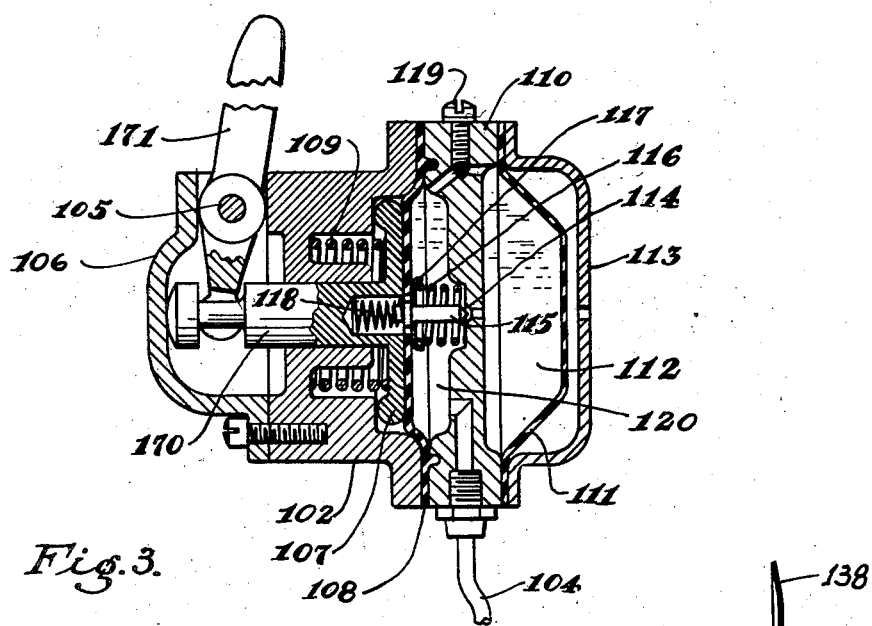
Figure 4:
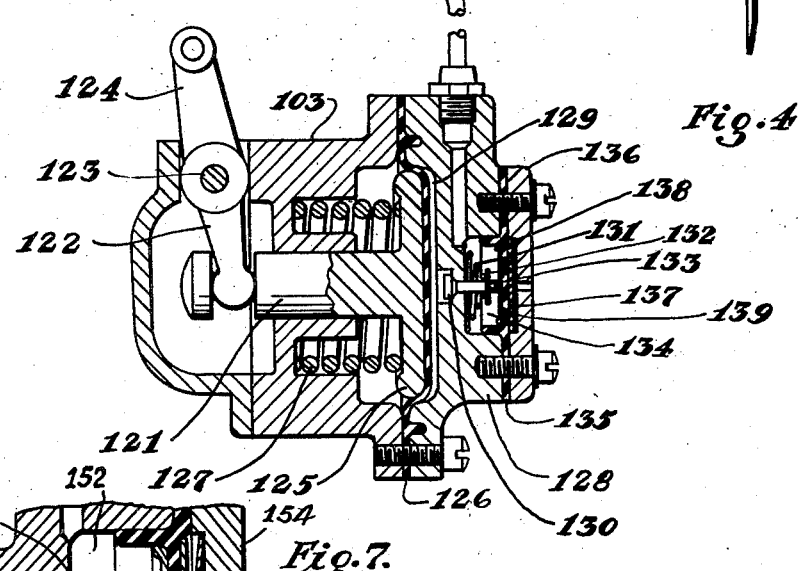
Figure 5:
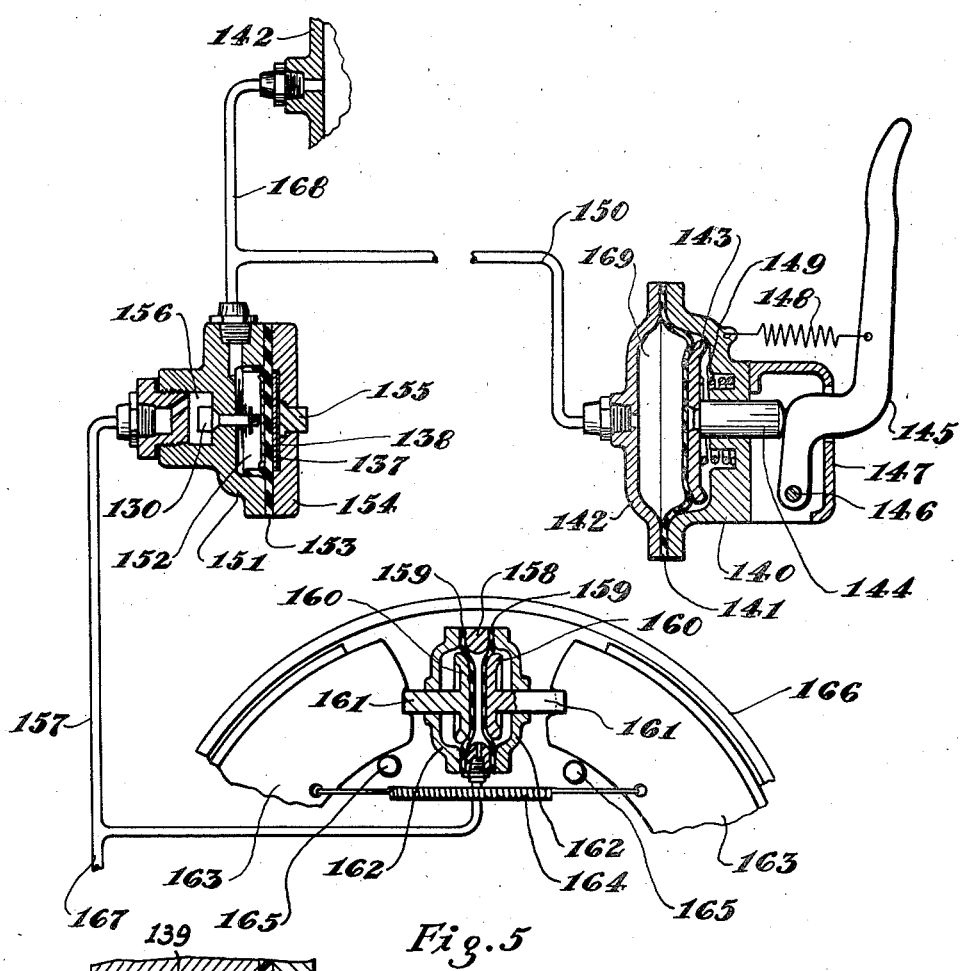

These features, among others, are obtained by the construction illustrated in the drawings, wherein:

Fig. 1 is a diagram showing the master cylinder and actuated element in section, applied to a one-line system;

Fig. 2, a diagram of the improved hydraulic control where a two-line system is used;

Fig. 3, a detail sectional view of a master cylinder and actuated element or motor, providing a hermetically sealed system, where only a single transmission line is used;

Fig. 4, a detail sectional view of a disc spring used in the construction shown in Fig. 3;

Fig. 5, a diagram showing the single line system applied to a brake.

Figure 7:
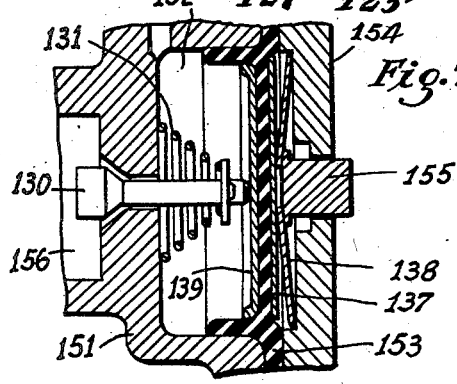
Figure 6:
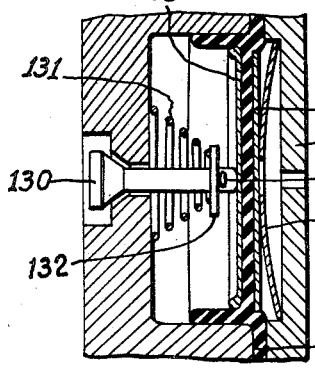

Fig. 6, an enlarged sectional view of the construction and diaphragm, shown with the valve open; and Fig. 7, an enlarged sectional view of the locking valve shown in Fig. 5, illustrated in a position assumed when the release button 155 is manually depressed.

Fig. 8 is an enlarged detail view of part of Figure 1.

Describing now Fig. 1, there is shown a prime mover 1, usually called master cylinder, and being equivalent to a pump, controlling the actuated element 2, usually called actuator (because it actuates a throttle or the like) or motor. Said master 1 consists of a cylinder 3 in which slides a piston 4 sealed by cups 5 held against said piston by means of conical coil springs 6 pressing against discs 7 and the heads 8 and 9 of piston rod 10 extending through said piston and being provided with clearance on its diameter as well as endwise, so that, as said springs 6 tend to center said piston rod, a passage is created from chamber 11 to reservoir 12. Said piston is actuated by means of a hand lever 13 turning a crank lever 14 pivotally connected with the piston rod 10 by means of a link 15.

A fluid line 16 connects said master cylinder with the motor 2 consisting of the cylinder 17 in which slides a piston 18 provided with seals 19, 19' and a piston rod 20 having a rod end 21 connected to the throttle lever 22 by means of a link 23 to operate a throttle 24 shown diagrammatically. Said piston 18 is normally held in the "off" position by means of a helical spring 25 seated on the cap 26 (in which the piston rod slides through a hole large enough to permit the breathing of air while the piston reciprocates) and acting against a cup 27 seated on the seal 19'. The line 16 leads into a chamber 28 sealed by a diaphragm 29 held down by a plate 30 having a hole in its center through which passes a solenoid plunger 31 working in a solenoid 32 and lightly pressed against said diaphragm by a helical spring 33. The head 34 of said plunger is of a non-magnetic material and a core 35 of soft iron is provided so that when the solenoid is energized, the plunger 31 is drawn out of the coil towards the diaphragm in its tendency to close the magnetic circuit through plate 30 and outer case 36. A check valve 37 controls the passage between chamber 28 and cylinder chamber 38 and is ordinarily seated by the force of a conical coil spring 39 resting against a disc or ring 40 pressed into the housing in the fashion of a Welch plug and having a hole to permit passage of the fluid. A bleed screw 41 is provided in the usual manner to allow removal of the air when filling the system.

Electrical synchronizing means are provided consisting of the solenoid already mentioned, connected to a source of electric power at 42, an electric line 43 to a circuit breaker 44 held open when the throttle is in the "off" position, and a circuit breaker 45 held closed when the master is in "off" position, connected by a line 46. Said circuit breaker 45 is grounded at one end, while the other is insulated from the housing as shown. A valve 47 controlling passage between 11 and 12 is held open when the master is in "off" position, whereby fluid may flow through line 48. When the master cylinder is not in "off" position valve 47 seats by virtue of the conical coil spring 49 which is stiff enough that it is not overcome due to suction in chamber 11. Suction, however, will operate diaphragm 29, which, on one side is provided with a thin layer of felt 50 to allow atmospheric pressure to said diaphragm in order to crack valve 37 acting through discs 51 and 52. The atmospheric pressure acting on diaphragm 29 is transmited to said discs 51 and 52, which serve as piston plates. In order that the check valve 37 may be opened by the solenoid plunger 31 without overpowering the entire diaphragm, the inner disc 52 must be constructed so that it may be moved to crack the valve without disturbing disc 51, but when the latter is moved towards the valve, the discs must travel in unison. Disc 51 is shown in section, whereas 52 is shown in full. Disc 51 has a hole to receive disc 52 loosely, which is recessed so that atmospheric pressure on the diaphragm is transmitted through disc 51 to disc 52, and from there to valve 37, to open it. But the tendency of disc 51 to return is not transmitted to disc 52. In order that said discs stay in their proper places, it is well to vulcanize them at one point to the diaphragm. Disc 51 may be vulcanized to the diaphragm on its entire surface, and it may be considered as a part of said diaphragm, disc 52 may be vulcanized to said diaphragm merely in the center, allowing movement relative to 51, so that little resistance is offered to the operation of the solenoid. The valve housing is provided with stops 53 so that the center disc does not shut off the passage from 38 to 28 when a suction is created in chamber 28.

In operation, considering the system filled with fluid, including reservoir 12, which is partly filled (the air in said reservoir being able to breathe through the cover flange or some breather being provided) now by applying lever 13 piston rod 10 is depressed, thereby seating at 9 against the piston, at the same time valve 47 closes. As 9 seats and the piston is depressed, a pressure is created in chamber 11 and the fluid is displaced, flowing into chamber 28, and from there into chamber 38 by lifting valve 37, there piston 18 is moved, overcoming spring 25. As soon as descension of piston 4 ceases, and consequently the pressure in chambers 11 and 28 decreases, check valve 37 closes and the fluid in 38 is locked under pressure created by spring 25. The throttle is held open in a certain position. As the hand of the operator is removed from handle 13, the piston rod is centered again by springs 6, so that a passage is open from chamber 11 to the reservoir. Fluid expansion can now take place without moving the throttle. As the operator returns lever 13 towards the "off" position (which is the position shown on the drawings) piston rod 10 is again seated on piston 4, this time by means of the head 8. As the piston rises, as suction is created in chambers 11 and 28, so that the atmospheric pressure deflects diaphragm 29, cracking valve 37. The fluid in 38 is now allowed to escape, but only while the master cylinder is moved towards the "off" position and a suction is maintained. As the master cylinder reaches the "off" position, valve 47 is opened, valve 37 closes, and piston 4 is centered again, leaving an open passage in addition to that created by valve 47.

Due to leakages and fluid expansion, it would be possible for the master cylinder to get out of step with the actuated element, to prevent this, I have provided a synchronizing device which operates as follows: In the "off" position, as shown in Fig. 1, the solenoid is deenergized because contact 44 is open. But now suppose the master cylinder is in the "off" position, but the motor 17 is not, then contact 44 is closed, and an electric circuit is created through the solenoid (45 being closed also) whereby the plunger presses against the diaphragm and through disc 52 opens valve 37, whereby the fluid in 38 may escape and the piston return to the "off" position, whence both master cylinder and motor are synchronized. As the described action takes place while the master cylinder is still returning, i. e. as soon as circuit breaker 45 closes the circuit, the solenoid does not actually have to crack valve 37, but merely need to hold it open. This is the reason why I have made discs 51 and 52 in two pieces. Now suppose the motor is in the "off" position, but the master cylinder is not. The master cylinder is returned creating a vacuum (it being a small exertion), in the "off" position valve 47 opens and fluid is drawn into chamber 11 from the reservoir. Thus the solenoid is used only very rarely, and is normally de-energized. In marine use, where the master cylinder is somewhere up on the bridge, and the motor down in the engine room, a head is created, which must be compensated by spring 33. Thus this spring may be made adjustable.

In Fig. 2 the construction is modified inasmuch as the locking valve, instead of by atmospheric pressure, is operated by pressure created in the master cylinder. For this reason two lines are necessary.

The whole system, in principle is still the same, consisting of a master cylinder or pump, and actuator or motor. Instead of the piston type pump as shown in Fig. 1 I illustrate a vane type pump in Fig. 2. or it may be a plurality of pumps, designated by 54 and 54', 54 is shown in section and the other one in front elevation. The actuator or motor 55 consists of cylindrical chambers 56 and 57 in which slide pistons 58 and 59 held against the end of a forked lever 60 by a tension spring 61 hooked to pins 62 extending through said pistons. A sleeve 63 fits into countersinks in said pistons to serve as a guide. Enough play is permitted endwise so that contact of the pistons against the end of lever 60 is always insured. The pistons are sealed with cups 64, which are of a well known construction. The lever 60 is keyed to a shaft 65 to which a lever 66 is secured, which, by means of a rod 67, transmits the motion to the element to be controlled. For this purpose I show a lever 68 which may represent a throttle lever, a shift lever, or the horn of a rudder, or other controlling surface. Both ends of the motor are alike. The check or locking valve 69 is held seated by a conical coil spring 70 resting against a plate 71 clamped between the central housing and the valve housing 72 by bolts, not shown. A chamber 73 is adapted to receive a slidable piston 74 stopping against a plug 75, on which side a chamber 76 is formed. Passages 77 and 78 lead from chamber 73 to chamber 76 on the opposite side. Lines 79, 80, and 81 complete the circuit. The pumps 54 may be of any conventional type, but must have provision for fluid expansion and by-pass. I provide a reservoir 82 and a tapered hole 83 into the pump chamber.

As in some applications it is necessary to use power for the operation of the actuator, as for instance in large boats for rudder control, I provide a power unit consisting of a power driven pump 84, 85 representing an electric motor, a valve 86 and a number of standard shut-off valves 87, 88, 89, 90, 91, and 92. Valve 86 is bored out to receive a plunger 93 held in a center position as shown, by means of springs 94. In this position there is a constant circulation of fluid from pump 84 through said valve and back to the pump. In order to indicate the position of the motor, a hydraulic indicating device is used consisting of a diaphragm cylinder 95 operated by a rod 96 connected with lever 66 of the motor. A small tube 97 leads to indicators 98, 99 built substantially like a conventional barometer, but graduated to show the position of the motor.

Considering first manual operation, when valves 89 and 90 are open and 87, 88, 91, and 92 are closed, pump 54 or 54' is operated by a turning wheel 100 having a knob 101. A pressure is then produced on one side, depending in which direction the pump is turned. This pressure is transmitted to chamber 73 on one side, where it lifts valve 69, and to chamber 76 on the other, where it moves piston 74 which opens valve 69 on that side. As soon as the pump is stopped, and the pressure consequently has dropped springs 70 seat the valves 69 again and the pistons are locked. Turning the pump in the opposite direction, merely changes the direction of action in the motor. It is obvious that any number of pumps or master cylinders may be used, but they must be constructed to be able to transmit the pressure in series, as is illustrated by the vane pump 54, where the orifice 83 is located on dead center so that no pressure is lost. Supposing that pump 54' is operated in such a manner that pressure is produced in line 81, whereby fluid is fed to pump 54; the latter thereby becomes a motor running idle, allowing the pressure and fluid to be transmitted to line 80. Since the top of the rotor, where it comes into sliding contact with the housing, seals off the passage to the reservoir (except for a very slow leakage), no pressure is lost. Yet the leakage is sufficient to allow passage of fluid into the reservoir due to expansion caused by heat. Furthermore the reservoir is hermetically sealed so that a pressure may build up in said reservoir. Or the whole system may be put initially under pressure.

Putting now the power unit in operation, valves 89 and 90 are closed, 87, 88, 91, and 92 are opened. Pump 84 provides a continuous flow in the direction shown, the valve being held in the neutral position by springs 94. As one of the hand pumps 54 or 54' is operated, the plunger 93 is thrown to one side and the fluid is directed through the actuator in substantially the same manner as already described when operated with the hand pump. As soon as the hand pump is not turned any more, springs 94 center the valve plunger 93 again and the motor locks.

Describing now Fig. 3, the construction shown in Fig. 1 is somewhat modified to provide a hermetically sealed and cheap unit, but where both master cylinder and motor are synchronized. The fluid in this system is under initial pressure, as will be described more clearly later. A master cylinder or pump 102 is connected to an actuator or motor 103 by a single line 104. Both units may be suitably mounted according to their use. The master cylinder 102 in its main body has a sliding piston 170 engaged by a forked hand lever 171 pivoted at 105 in a cover 106. One extremity of the piston has a plate 107 held against a diaphragm 108 by a helical coil spring 109. Said diaphragm 108 is clamped between the main body and a sandwich plate 110, to which an elastic reservoir cover 111 forming a reservoir 112, and a dust cover 113, are secured. Said sandwich plate has a valve seat 114 on which fits a needle valve 115 in the "off" position held open by a spring 116 seated against a disc 117 having a central hole through which the stem of said valve 115 may slide. The latter is provided with a collar so that in the "off" position, as shown, the valve is unseated by spring 116, overcoming the coil spring 118 which serves to seat the valve when the master cylinder has left the "off" position, and ordinarily holds the collar of said valve against the disc 117. A bleed screw 119 is provided in the usual manner, for the sake of simplicity only one has been shown, stopping in its tightened position passage between chamber 120 and reservoir 112, but in actual construction it is easier to provide two separate bleed screws.

The motor 103 has a sliding piston rod 121 engaged by a forked lever 122 pivoted at 123 and having an arm extension 124 to which the element to be operated is connected. The piston rod 121 has a plate or piston 125 at one end pressed against a diaphragm 126 by means of a coil spring 127. The diaphragm 126 is clamped tightly between the main body and cylinder head 128, whereby a chamber 129 is formed communicating with which is controlled by a check valve 130 ordinarily held seated by a conical coil spring 131, which engages the valve stem by means of a washer 132 and cotter pin 133. Chamber 134 is closed off from the atmosphere by means of a diaphragm 135 clamped down securely by a cover plate 136 which has a recess to receive a disc 137 and a disc spring 138, more clearly shown in Fig. 4 in its relieved position. The inner face of said diaphragm 135 is provided with a disc 139 which acts as piston plate for said diaphragm. The line 104 leads to chamber 134, thereby providing communication between chamber 120 in the master cylinder and chamber 134 in the motor.

Both master cylinder and motor are shown in the "off" position. Suppose the operator applies the hand lever 171 and depresses diaphragm 108, valve 115 closes as spring 116 is compressed and coil spring 118 seats said valve. The fluid displaced flows then through line 104 into chamber 134. As the pressure is greater than in chamber 129, the check valve or locking valve 130 opens and piston 125 begins to move. As soon as the master cylinder is not operated any further, the pressure in chambers 120 and 134 drops and the check valve 130 closes, whereby the fluid in chamber 129 is arrested and the motor hydraulically locked. When the operator moves lever 171 towards the "off" position, he overcomes spring 109 and the pressure in chambers 120 and 134 drops to approximately atmospheric pressure. Now as the disc spring 138 tends to assume a shape similar to that shown in Fig. 4, and is ordinarily pressed flat by the pressure in chamber 134, it deflects, pressing disc 137 against diaphragm 135 when the pressure in chamber 134 has dropped to a certain point. In so doing the diaphragm is depressed, opening the locking valve 130, thereby the fluid in chamber 129 is allowed to escape so that the motor returns towards the "off" position at the same rate as the master cylinder.

The master cylinder and motor are automatically synchronized every time the master is moved in the "off" position.

Assuming the two to be out of synchrony where the master cylinder reaches the "off" position first; then valve 115 is opened, chambers 120 and 134 are under atmospheric pressure so that spring 138 opens valve 130. Piston 125 then returns into the "off" position, displacing the fluid into reservoir 112. Both are in step again. Supposing now that the motor 103 reaches the "off" position first; then by returning the master cylinder towards the "off" position, a suction is created in chamber 120 (as well as in the motor which is of no consequence), so that the atmospheric pressure in the reservoir opens valve 115, so that fluid flows from said reservoir to 120. As the master has reached the "off" position, the two units are in synchrony again.

It is possible to make the disc spring 138 with a zero rate, to give it a uniform action, the characteristics of disc springs are well known, and therefore need not be described. It is preferable to place it in such a way that the central part presses against the diaphragm, and disc 137 is preferably made of an elastic material so that the diaphragm 135 is depressed mostly in the center, thus prolonging its life. It is also desirable to have very little clearance between the stem of valve 130 and disc 139, to prevent lost motion.

I will now describe Fig. 5, where the novel locking valve is applied to a brake or clutch.

The main body of the master cylinder or pump is designated by 140. A diaphragm 141 is clamped securely by a cover or head 142 by means of screws, not shown. Said diaphragm rests against a piston plate 143 to which a piston rod 144 is riveted sliding in a bearing in said housing 140 and being engaged by a cam lever 145 pivoted at 146 in a cover 147. A spring 148 holds said lever engaged, while another spring 149 keeps the piston in contact with the diaphragm 141. A pipe line 150 leads to the body 151 of the locking unit having a chamber 152 sealed off by a diaphragm 153 clamped down securely by a cover 154 having a recess to receive the disc 137 and disc spring 138, already described in Figs. 3 and 4; in addition, this cover has a push button 155 by means of which the valve 130 may be opened and the brakes released. Passage 156 communicates by means of a pipe line, or preferably rubber tubing 157 to a wheel cylinder 158 having diaphragms 159 engaging pistons 160 whose piston rods 161 are guided in the covers 162 and engage the brake shoes 163 held in the "off" position by a stiff spring 164 against stops or locating pins 165 in the usual manner to clear the brake drum 166 when in the "off" position. Line 167 leads to another brake unit substantially the same as already shown (and is therefore not repeated again) while line 168 leads to another master cylinder substantially the same as that already shown, and is therefore broken off in order not to encumber the drawing.

The system is shown in the "off" position. Springs 148 and 149 are very weak and merely serve to hold lever 145 and piston 143 in contact with diaphragm. Spring 149 may be obviated or is subordinate to disc spring 138, i. e. when spring 148 is manually overcome spring 149 cannot maintain sufficient pressure to keep valve 130 closed. In operation, when the master cylinder or pump is applied by means of lever 145, and diaphragm 141 is depressed, a pressure is created in chamber 169 which is transmitted to chamber 152, where valve 130 is lifted due to the higher pressure in chamber 152 compared with that in passage 156. Thus fluid flows into the wheel cylinder or motor 158, applying the brake shoes, and overcoming spring 164. As the hand is removed from lever 145 the pressure in chambers 169 and 152 drops to the initial pressure created by spring 148 which is enough to overcome spring 138 so that the locking valve 130 is seated and the brakes are locked. I mentioned herein before that lines 157 and 167 are preferably of a slightly elastic material, as for instance reinforced rubber tubing, so that the brakes are kept on even though the fluid contracts due to temperature changes.

The brake can be released in two ways: Either by pressing push button 155, or by returning lever 145 towards the "off" position. While the latter operation is performed, spring 148 is overcome, and the pressure in chamber 169 drops to almost atmospheric, whence spring 138 depresses diaphragm 153 and thereby opens the locking valve 130. The fluid from the motor is then returned due to the force of spring 164, so that the shoes become disengaged.

If instead of manually returning hand lever 145 the push button is depressed, then the fluid returning from the motor through the open valve 130 is displaced into chamber 169, returning the master to the "off" position.

I do not wish to be limited in the application of my invention to the embodiments shown, which merely illustrate a few applications, nor to the particular types of master cylinder and motor, as there are a number of master cylinders and motors known, and must be selected according to the purpose. Thus for certain throttle controls, where a tachometer is used beside the master cylinder, any type of pump may be used. It may be a gear pump, or vane or piston type pump, or even a centrifugal pump. But for use in aircraft, special, although various constructions must be used, while in larger units it becomes necessary to use a source of power other than manual, such as in hoists, hydraulic elevators, hydraulic jacks, marine steering etc.

In Fig. 5 the invention is carried out for a hand brake, but the same construction may be used for other brakes as well as clutches. Furthermore all systems may be carried out either with piston type cylinders or diaphragms or "Sylphons". For diaphragms I preferably use the reinforced type with radial threads so that in action, the system is solid.

Since it is desirable to operate the system under pressure to eliminate the infiltration of air the constructions shown in Figs. 2, 3, and 5 are especially preferable. The construction shown in Fig. 5, as well as all the others, eliminate the necessity of ratchets, which are in use in present day hydraulic remote control.

The terms, pump, prime mover, and master cylinder used herein, denote all one thing, as already described, whereas the terms motor or actuator, or wheel cylinder, are applied to the driven or secondary element which in turn operates or controls some third element, such as a throttle, a brake, or a control surface.

I am aware that prior to my invention hydraulic controls have been made, I therefore do not claim such a combination broadly; but, I claim:

1. In a hydraulic system, a master cylinder, a motor, a hydraulic line between said master cylinder and said motor, means to operate said master cylinder, a check valve between said master cylinder and said motor to allow fluid to pass from said master to said motor upon the pressure producing movement of said master cylinder, but not vice versa, resilient means to return the motor to the "off" position, and means responsive to the suction created by said master cylinder upon its retractile movement to open said check valve to allow said motor to return to the "off" position.

2. In a hydraulic transmission, a master cylinder, a motor, a single hydraulic line from said master cylinder to said motor, to transmit fluid to and fro, said master cylinder being adapted to produce pressure and suction according to manual manipulation thereof, a check valve permitting flow of fluid from the master cylinder to the motor and preventing return flow from the motor, and means responsive to a certain pressure reduction from the master cylinder upon its retractile movement to open said check valve to allow flow of fluid from said motor to said master cylinder and thereby return towards the "off" position, substantially as described.

3. In a hydraulic transmission, a master cylinder, a motor, a single fluid line connecting said master cylinder with said motor, a reservoir, means to provide communication between said reservoir and said master cylinder when the latter is in the "off" position, means to manually operate said master cylinder to produce variable pressure, resilient means yieldingly urging to return the motor to its "off" position, thereby tending to return fluid to the master cylinder, a check valve permitting flow of fluid from the master cylinder to the motor and preventing return flow from the motor, and means responsive to a certain pressure reduction caused by said master cylinder upon its retractile movement to open said check valve to allow flow of fluid from said motor to said master cylinder and thereby permit return towards the "off" position.

4. In a hydraulic transmission, a master cylinder, a motor, a single fluid transmission line connecting said master cylinder with said motor, a check valve permitting flow of fluid from the master cylinder to the motor and preventing return flow from the motor, a reservoir, means to provide communication between said reservoir and said master cylinder when the latter is in "off" position, means to operate said master cylinder to produce variable pressure, resilient means tending to return the motor to its "off" position, thereby tending to return fluid to said master cylinder, means using the pressure of the atmosphere to open said check valve when a certain pressure reduction is produced in the master cylinder upon its retractile movement, to allow flow of fluid from said motor to said master cylinder and thereby permit return towards the "off" position, and means to synchronize said master cylinder and motor when said master cylinder is returned to its "off" position.

5. The construction as claimed in claim 4, where said reservoir is of the elastic diaphragm type, to hermetically seal the operating fluid.

6. The construction as claimed in claim 4, and resilient means acting on the master cylinder to put the fluid therein under an initial pressure above atmospheric, means yieldingly tending to open said check valve to balance said initial pressure, whereby said check valve will open when the pressure in the transmission line is reduced to near atmospheric.

7. In a hydraulic transmission, a master cylinder, a motor, means to transmit fluid from said master cylinder to said motor to operate said motor, a check valve in said line between the master cylinder and motor, said check valve permitting flow from said master cylinder to said motor upon the pressure movement of the master cylinder and preventing flow from the motor to the master cylinder when the pressure movement has ceased, and means responsive to the decrease in pressure produced by said master cylinder to open said check valve for the purpose of returning said motor to its original position.

8. The construction as claimed in claim 1, and means to manually open said check valve.

9. The construction as claimed in claim 4, where said reservoir is of elastic material and hermetically sealed against the atmosphere, and where the master cylinder and motor are of the diaphragm type to prevent leakage, to provide a sealed hydraulic system into which no air can enter in any position.

WILLIAM STELZER.